July 14, 1970  D. R. TANGUY  3,520,062
CALIBRATED SHEAVE WHEEL

Filed March 14, 1968

INVENTOR.
DENIS R. TANGUY

BY Brumbaugh, Free, Graves & Donohue his ATTORNEYS

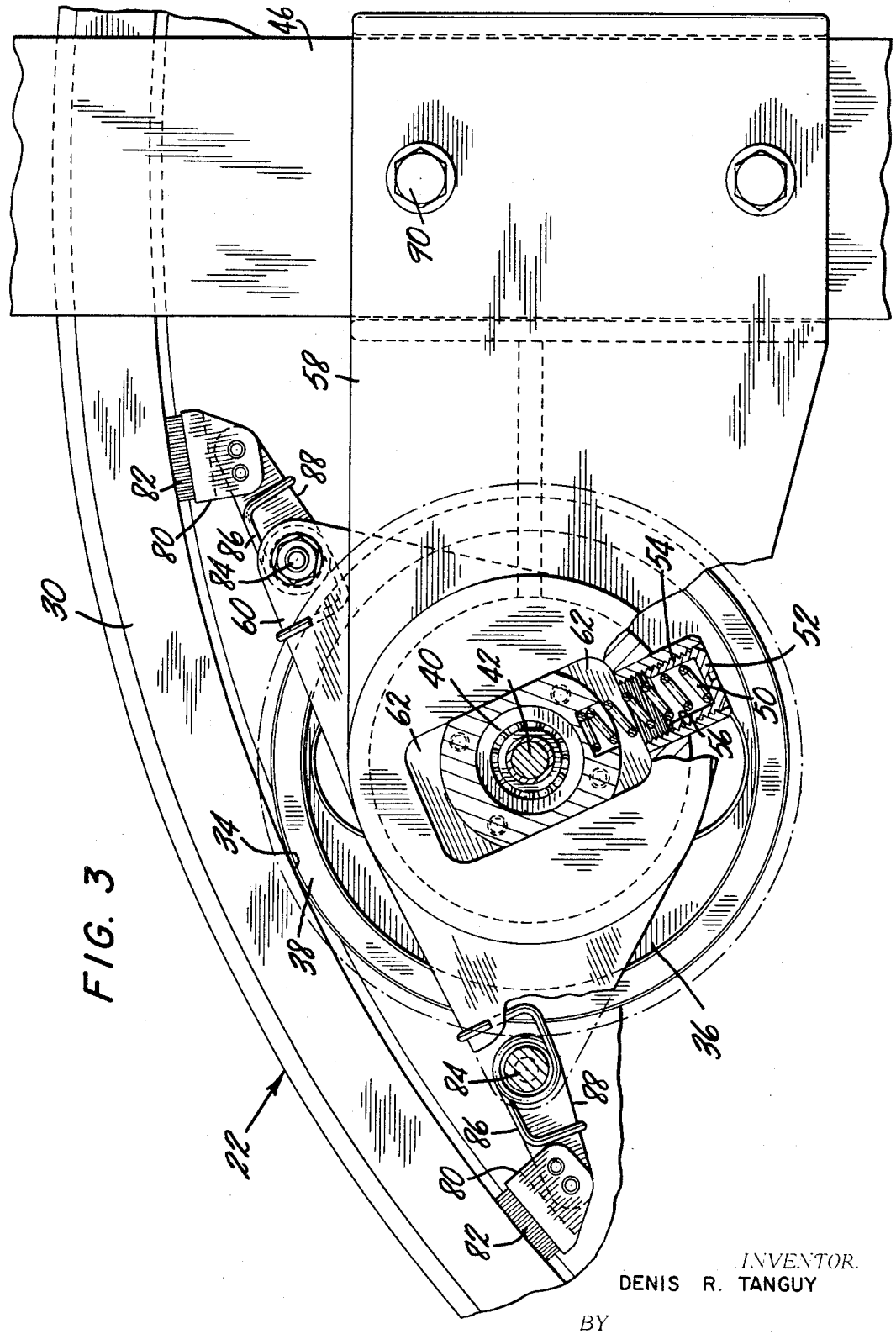

United States Patent Office 3,520,062
Patented July 14, 1970

3,520,062
CALIBRATED SHEAVE WHEEL
Denis R. Tanguy, Darien, Conn., assignor to Schlumberger Technology Corporation, Houston, Tex., a corporation of Texas
Filed Mar. 14, 1968, Ser. No. 713,158
Int. Cl. G01b 3/12
U.S. Cl. 33—129          6 Claims

ABSTRACT OF THE DISCLOSURE

A cable suspending a well tool in a well bore is operatively carried by a pulley that is correspondingly rotated by the cable as the well tool is moved in the well bore. Cable-measuring apparatus is provided including a measuring wheel that is operatively engaged with a circular track portion on the pulley and, as the pulley rotates, driven thereby through a given number of revolutions for a known distance around the circular track. To offset dimensional variations of the circular track induced by temperature changes, the measuring wheel is made of a material having a negligible coefficient of linear expansion so that each revolution of the measuring wheel will always represent a constant incremental length of cable relating to the actual distance that the wheel has traveled to provide accurate measurements of the cable length irrespective of changes in ambient temperatures.

Background of the invention

This invention relates to measuring methods and apparatus; and, more particularly, to novel and highly-effective methods and apparatus facilitating the measurement of the length of a wire or cable from which a well tool is suspended in a well bore.

It is, of course, necessary to know at all times the precise depth at which a well tool is suspended in a well bore. Heretofore, the depth of a well tool has been determined by means of measuring apparatus as shown in Pat. No. 2,778,117 and Pat. No. 2,815,577. Although devices such as these are successful, their accuracy is dependent upon such factors as the cable-engaging measuring wheel not slipping as the cable is moved into or out of a well bore. Thus, to prevent slippage of these measuring wheels over a cable that is often made slippery by "mud" or other well bore fluids, the wheels are often urged with considerable force against an unsupported span of the cable. This, however, causes the cable span to sag slightly and a slight error is introduced thereby for which an appropriate compensation must be made.

Summary of the invention

An object of the present invention is to provide new and improved apparatus and methods facilitating the accurate measurement of the length of a wire or cable used to suspend a well tool in a well bore. In particular, an object of the invention is to eliminate temperature changes as a source of error in the measurement of the depth of a well tool suspended in a well bore. Another object is to accomplish the foregoing objects at minimum expense and employing apparatus of simple and sturdy construction.

The foregoing and other objects of the invention are attained, in a representative embodiment thereof, by the provision of pulley means over which a wire or cable is trained, the pulley means being formed with a coaxial measuring track. The apparatus further includes a measuring wheel rollingly engaging the track, the measuring wheel being formed of a material having a negligible coefficient of thermal expansion. The pulley means and track are turned by the movement of the cable thereover, and the measuring wheel makes a number of turns which is a function of the length of the cable moving over the pulley means irrespective of dimensional changes from temperature variations of the pulley means. In addition, means are provided for producing a reading proportionate to the number of turns made by the measuring wheel.

Brief description of the drawing

An understanding of additional aspects of the invention may be gained by a consideration of the following detailed description of a representative embodiment thereof, taken in conjunction with the appended figures of the drawing, in which:

FIG. 3 is a fragmentary sectional view, in a plane perpendicular to the plane of FIG. 2, of the apparatus of the invention.

Description of the preferred embodiment

Figure 1:
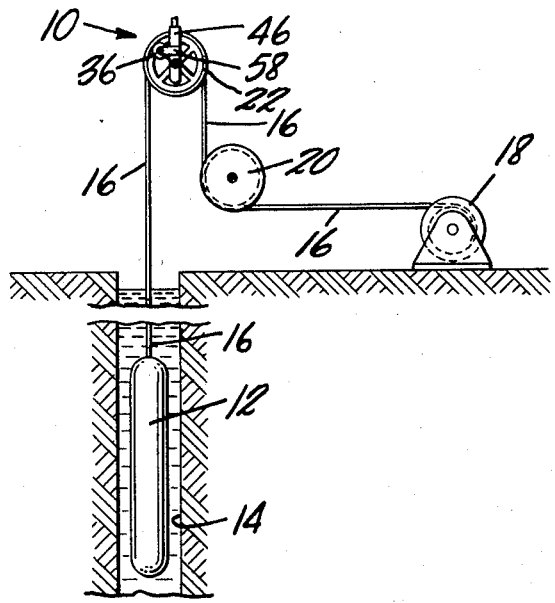
FIG. 1 is a diagrammatic view in elevation illustrating the employment of apparatus constructed in accordance with the invention to measure the depth of a well tool suspended in a well bore.

FIG. 1 shows apparatus 10 constructed in accordance with the invention. The apparatus 10 is employed to measure with great precision the depth of a well tool 12 suspended in a well bore 14 by means of a wire or cable 16. The cable 16 is spooled on a winch 18 from which it is paid out around a lower sheave or pulley 20 and an upper sheave or pulley 22. As is typical, the lower pulley 20 is secured to the wellhead or derrick (not shown) on one side of the well bore 14 and in line with the winch 18. Similarly, the upper pulley 22 is suspended over the well bore 14 so that the cable 16 in its descent from the upper pulley 22 into the well bore passes substantially along the vertical axis thereof. The pulleys 20 and 22 are, of course, secured so as to permit rotational movement of the sheaves but prevent substantial translational movement thereof during the raising and lowering of the well tool 12.

Figure 2:
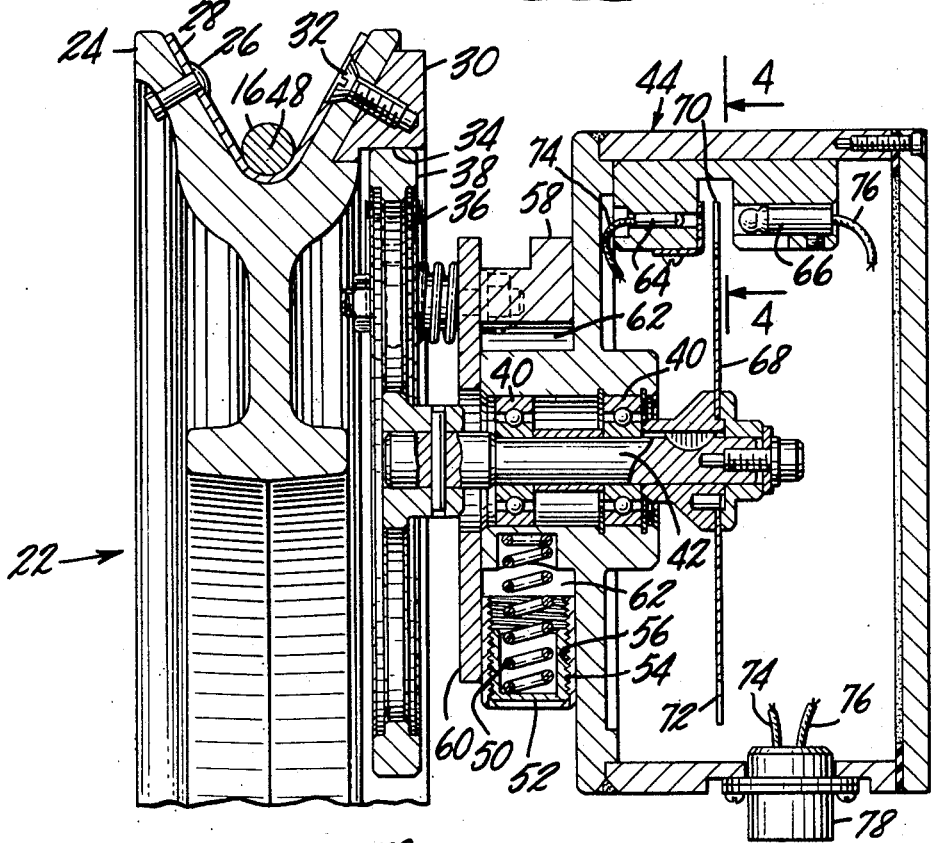
FIG. 2 is a fragmentary axial section, on a scale much larger than that of FIG. 1, of apparatus constructed in accordance with the invention.
Figure 4:
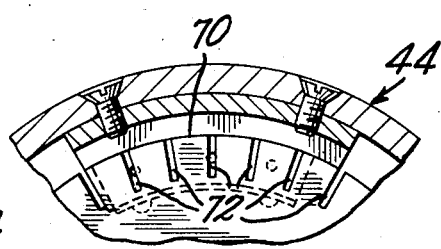
FIG. 4 is a fragmentary sectional view taken in the plane 4—4 of FIG. 2 and looking in the direction of the arrows.

The apparatus of the invention, shown in detail in FIGS. 2–4, permits measuring the depth of the well tool 14 independently of changes in temperature or cable sag. Such expansion and contraction may be considerable in the case of well-completion operations begun at midnight and still underway the following afternoon. As FIG. 2 shows, the upper pulley 22 is provided with a grooved rim 24 to which is affixed by suitable fastening means 26 a wear plate 28. The cable 16 is acommodated by the grooved rim, and an annular track member 30 is affixed to the rim 24 by suitable fastening means such as screws 32. The track member 30 is formed around its inner circumference with an annular track 34 that is coaxial with the pulley 22. A measuring wheel 36 is provided with an outer bearing member 38 which rolls on the track 34. The rolling movement of the measuring wheel 36 and member 38 is facilitated by ball-bearing mountings 40 mounting a shaft 42 with which the measuring wheel 36 is integral.

By means of the mountings 40, the shaft 42 and measuring wheel 36 including the member 38 are adapted to rotate in response to rotation of the measuring track 34. Translation of the measuring wheel 36 around the circumference of the track 34 is prevented, however, by the mounting of the bearings 40 in a housing 44 which is securely attached to a member 46 (FIG. 3) in which the pulley 22 is mounted.

The track 34 preferably has the same radius of curvature as the center 48 of the cable 16 in passing around the pulley 22. It will be appreciated, therefore, that in view of the size of such pulleys, the pulley 22 may advantageously be made of a light strong material, such as aluminum, adapted to withstand heavy loads and may be of large and rugged construction. Typically, the pulley 22 may be 36-inches in diameter. Use of aluminum, however, introduces significant errors since aluminum has a coefficient of thermal expansion of about $12.4 \times 10^{-6}/°F$. For example, with a change of only 40° F. in ambient temperature during a wideline operation, a pulley initially 36-inches in diameter expands to a diameter of 36.018-inches. Uncompensated, this error amounts to about 0.0566-inch per revolution or 56.6-inches per 1000 revolutions. In round numbers, this is an error of about 5-feet per 10,000-feet from thermal expansion alone.

Such errors are eliminated, however, in accordance with the present invention. The measuring wheel 36 is biased by a compression spring 50 to maintain it in positive contact with the track 34. The force with which the compression coil spring 50 urges the measuring wheel 36 against the track 34 is adjustable by means of a cap 52 formed with a threaded cylindrical wall 54 adopted to be received in a threaded aperture 56 formed in mounting means 58 which is integral with the member 46 mounting the pulley 22.

The housing 44, including an end plate 60, is slidable within a slot 62 formed in the mounting means 58. Thus, the housing 44, the shaft 42 mounted thereon, and the measuring wheel 36 mounted on the shaft 42 are adapted to slide within the slot 62 so that the measuring wheel 36 moves radially outwardly and inwardly with respect to the pulley 22 as the pulley 22 expands and contracts with changes in temperature.

The measuring wheel 36 is made of a so-called "Invar" alloy which are exceptionally low-expansion alloys composed principally of iron and nickel (with the amount of nickel being in the order of 36%) having a particularly-low coefficient of linear or thermal expansion in the order of about $-0.2$ to $+1.4 \times 10^{-6}$ per °F. or other similar alloys having correspondingly negligible coefficients of linear expansion. The measuring wheel 36 therefore accurately measures the linear travel of the cable 16 over the pulley 22 irrespective of dimensional changes of the pulley 22. Although the circumference of the track 34 changes in accordance with ambient temperatures, it is always directly proportional to the length of cable in contact with the pulley 22 at any given time. Thus, irrespective of thermal dimensional changes in the pulley 22 and the track 34, the measuring wheel 36 will always make one revolution for a selected circumferential distance along the track.

From another standpoint, the incremental length of cable required to turn the pulley 22 one revolution at a low temperature is slightly less than the incremental length of cable required to turn the pulley 22 one revolution at a higher temperature. Inasmuch as the length of the track 34 changes with temperature along with the circumference of the pulley 22, the measuring wheel 36, which is of constant diameter notwithstanding changes in temperature, rotates through a correspondingly different angular distance for each revolution of the pulley 22. The measuring wheel 36 therefore accurately indicates the length of cable passing over the pulley 22. Because the measuring wheel 36 has constant diameter, each revolution thereof represents a constant incremental length of cable 16 that is passing over the pulley 22 regardless of the thermal expansion or contraction of the track 34.

It should be noted at this point that by arranging the measuring wheel 36 to cooperate with the upper sheave or pulley 22, the previously-mentioned problems of slippage and cable sag are also eliminated. For example, although the cable 16 may be slippery, the combined weight of the well tool 12 and opposing force imposed by the winch 18 will always be sufficient to insure that the upper pulley 22 is rotated whenever the cable is moved. Moreover, since the measuring wheel 36 is in contact with only the sheave 22, the problem of cable sag is simply not presented.

In order to make the length of the cable 16 in contact with the pulley 22 over a given arc equal to the length of the track 34 over the same arc, the track 34 is preferably made to have the same radius of curvature as the central axis 48 of the cable 16 as the cable passes over the upper pulley 22. Where a cable of larger or smaller diameter is carried on the pulley 22, a small error is introduced, but, inasmuch as the error is constant, it is readily compensated for in the instrumentation circuitry.

A readout proportionate to the angular distance through which the measuring wheel 36 revolves is provided by a light-responsive photoelectric cell 64, a lens-end lamp assembly 66, and a disc 68 mounted for rotation with the shaft 42 and having its periphery 70 extending between the cell 64 and lamp 66 and formed with a plurality of light-transmitting slots 72. Leads 74 and 76 from the cell 64 and lamp 66, respectively, extend to a plug 78 for connection with an external power supply and any suitable display means, which may be conventional.

The measuring wheel 36, shaft 42, disc 68, cell 64, lamp 66, and housing 44 move within the limits permitted by the slot 62 as a unit, so that the radial movement of the measuring wheel 36 does not cause any misalignment of the cell 64, lamp 66 and slotted portion 70 of the disc 68.

In a conventional manner well understood by those skilled in the art, the cell 64 produces an output pulse each time rotation of the disc 68 brings a slot 72 into alignment with the cell 64 and lamp 66. The output pulses from the cell 64 may be employed to step a counter to provide a direct visual display of the instantaneous depth of the device 12.

The track 34 is kept clean by brushes 80 having nylon bristles 82. The brushes 80 are carried on arms 88 pivotally mounted at 84 on the plate 60. Biasing means such as springs 86 bear against the plate 60 and the arms 88 to urge the bristles 82 against the track 84.

The apparatus of the invention is easily mounted on the pulley frame 46 by suitable fastening means such as threaded bushings 90. Accordingly, extensive modification of conventional apparatus to accommodate the apparatus of the invention is obviated.

Thus there is provided in accordance with the invention novel and highly-effective methods and apparatus facilitating accurate measurement of the length of a wire, cable or a like article employed to suspend an instrument or a like device in a well bore. The accuracy of the measurement achieved in accordance with the invention is unaffected by changes in ambient temperature.

Many modifications of the representative embodiments of the invention disclosed herein will readily occur to those skilled in the art. While the apertures 72 are represented in FIG. 4 as being angularly spaced apart at intervals of 10°, other angular spacings are of course possible. Similarly, while the angle between the vertical and the normal to the tangent between the pulley 36 and the track 34 is illustrated in FIG. 3 as being about 25°, the angle is not critical and may be varied at will. Likewise, the force exerted by the compression coil spring 50 may be adjusted by the cap 52 within wide limits to vary the force with which the measuring wheel 36 bears against the track 34. Forces ranging from negligible to 75 pounds or more are contemplated. Accordingly, the invention is to be construed as including all of the embodiments thereof.

I claim:

1. Apparatus adapted for measuring the length of a cable and comprising: pulley means including a circular sheave journalled thereon and adapted for rotation about an axis upon passage thereover of a cable carried thereon; means on said sheave defining a circular track about said axis of rotation; and means responsive to rotation of said sheave in response to passage of a cable over said sheave and adapted for measuring the length of a cable passing thereover, said cable-measuring means including a measuring wheel operatively journalled on said pulley means and having a peripheral portion contacting said track and rolling therealong so that said measuring wheel turns a predetermined number of revolutions for a selected circumferential distance along said track, said measuring wheel having a negligible coefficient of linear expansion in relation to the coefficient of linear expansion for said sheave, said track being in the shape of an annulus coaxial with said sheave and having a radius of curvature equal to the radius of curvature of the center of a cable passing over said sheave.

2. The apparatus of claim 1 wherein said cable-measuring means further includes: indicating means responsive to the turning of said measuring wheel for providing indications representative of the length of a cable passing over said sheave.

3. The apparatus of claim 1 wherein the coefficient of linear expansion of said measuring wheel is no greater than about $1.4 \times 10^{-6}$ per °F.

4. The apparatus of claim 1 wherein said measuring wheel is of an Invar alloy having a nickel content of about 36%.

5. Apparatus according to claim 1 further comprising: biasing means adapted for urging said measuring wheel against said track to facilitate following of said track by said measuring wheel as said track expands and contracts with changes in temperature.

6. Apparatus according to claim 1 wherein said measuring wheel engages said annular track on the interior surface thereof.

References Cited

UNITED STATES PATENTS

| 2,276,302 | 3/1942 | Guttmann | 33—139 |
| 2,640,267 | 6/1953 | Geier | 33—46 |
| 2,815,577 | 12/1957 | Ferre. | |
| 2,778,117 | 1/1957 | Heinemann. | |
| 2,271,742 | 2/1942 | McCullough | 33—126.5 |

WILLIAM D. MARTIN JR., Primary Examiner

U.S. Cl. X.R.

33—125